April 9, 1940.  C. LYNG  2,196,268
FILM GAUGE CONTROL
Filed March 11, 1937
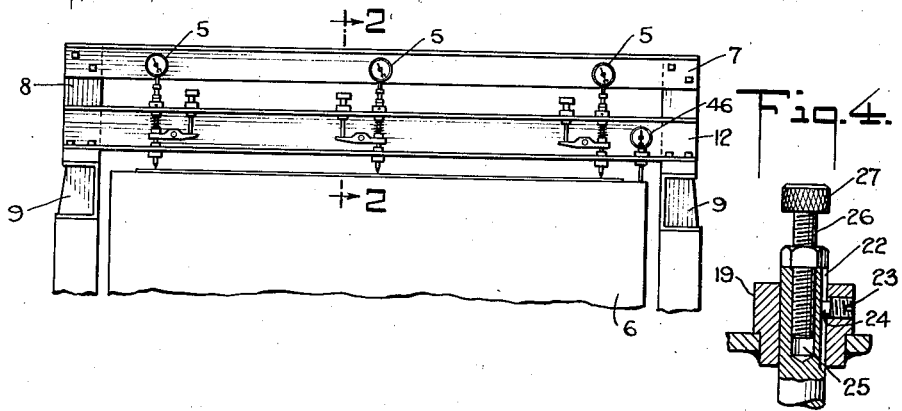
INVENTOR
Carsten Lyng
BY
ATTORNEYS Patented Apr. 9, 1940

2,196,268

UNITED STATES PATENT OFFICE 2,196,268

FILM GAUGE CONTROL

Carsten Lyng, Union, N. J., assignor to Celluloid Corporation, a corporation of New Jersey Application March 11, 1937, Serial No. 130,422

7 Claims. (Cl. 18—15)

This invention relates to the method of and apparatus for controlling the gauge of cellulose derivative films and foils, and relates more particularly to a method of and apparatus for measuring the gauge of the film or foil immediately after the dope is applied to the casting wheel, i. e. while the dope is still in liquid or plastic condition.

An object of this invention is the provision of an improved method for controlling the gauge of cellulose derivative films or foils.

Another object of this invention is to provide novel apparatus for measuring the gauge of the film dope while the same is in liquid or plastic condition.

Other objects of this invention, together with certain details of construction, combinations of parts, will appear from the following detailed description and the appended claims.

In the manufacture of film by the dope casting method, the control of the gauge or thickness of the film is of utmost importance. For example, films for motion picture and photographic work are required to be within narrow limits with respect to thickness, i. e. a 0.0075 of an inch film will have a tolerance from about 0.0072 to 0.0078 of an inch. Variations above and below these limits result in unusable material which must be scrapped or reworked with attendant increase in manufacturing costs. While the largest outlet for film is for photographic use, there are numerous other applications which have their special requirements of closely controlled gauge.

This invention is also applicable in the manufacture of foils as well as films. Foils are usually considered of a lower order of thickness than films, say, less than 0.003 of an inch, and are particularly useful as wrapping materials. Here again efficient manufacturing operations depend upon control of gauge.

The dope casting process for making films and foils comprises forming a dope of uniform viscosity and body, feeding the dope to a hopper from which it is spread by means of a scraper, or by extrusion from the nozzle of the hopper onto a continuously moving casting surface which may be the highly polished face of a large wheel or the surface of an endless belt. In the travel of the casting surface the volatile solvents in the dope evaporate leaving a self-supporting film or foil which is stripped from the surface, dried or seasoned in a hot air chamber and finally wound on a spool in a continuous roll. The rolls are about 40 inches wide and from 500 to about 4,000 feet long, depending upon the thickness of the film or foil.

The cellulose derivatives used are not always of uniform viscosity or solubility characteristics so that successive batches of dope may vary in viscosity. These batches are not mixed one with the other but may assume separate layers in the holding tanks with little intermingling. When each layer or zone of dope arrives at the hopper, the rate of feed onto the casting surface will gradually change due to the different viscosity of the dope. Such changes are not ordinarily perceptible and would not be detected until off-gauge material is found at the spool. Furthermore, the cast dope undergoes lateral and transverse shrinkage as it loses its volatile solvents, and the film is subjected to tension and strains in its passage through long air driers.

As the process is continuous there is no opportunity for checking the gauge of the film across its width by the ordinary micrometer methods. It has been proposed to use an optical micrometer, the operation of which depends upon certain principles of optics, for checking the gauge of the film or foil. Since the working of the optical micrometer is dependent upon three conditions, namely, the angle of incidence of a beam of light passing through the film or foil whose gauge is being measured, the thickness of the film or foil and the index of refraction and material of which it is composed, the optical micrometer was not wholly satisfactory, particularly when thin films and foils were being run.

Heretofore it has been the practice, as each roll was cut, to gauge the film across its width with a hand micrometer. If the gauge was uneven or outside of thickness variations the roll was either scrapped or consigned to some other use at a reduced price. An adjustment was then made in the hopper feed changing the flow of dope onto the casting surface to give the film or foil the desired thickness. The adjustment was made by trial and error, it being necessary after each adjustment to cut and regauge the film at the winding spool when the first portion affected by the adjustment arrived there. It often required several hours of adjusting, cutting and gauging to arrive at the proper thickness of film on the winding spool. During this time there accumulated an excessive amount of scrap, making for an uneconomical procedure.

In accordance with this invention, the gauge of the film or foil at the winding spool may be controlled over an extended period of time without cutting the film or foil by gauging the thickness of the dope, which ranges from 5 to 10 times the thickness of the resulting film, at various points across its width on the casting surface just after the dope leaves the hopper and adjusting the hopper feed to give a predetermined thickness of dope at the point gauged. The invention comprises, in general, a system of gauging devices for determining the dope thickness at predetermined points across the width of the dope on the casting surface. From the gauge readings adjustments can be made in the hopper feed, the feed of which can be instantly checked. Frequent readings and adjustments assure uniform gauge at the winding spool and cut scrap losses down to a minimum. More specifically, the invention comprises mounting a series of micrometers, say, three or more, across the casting surface near the hopper, the casting surface itself forming the anvil of the micrometers. The micrometer screw is terminated in a pin point which is raised and lowered to contact the dope surface. The dial and pointer of the micrometer indicates the elevation of the pin above the casting surface. Means may also be provided for checking variations in the surface of the casting wheel due to the thermal expansion or contraction of the wheel in relation to the scraper.

In order further to illustrate my invention, reference is had to the accompanying drawing wherein:

Fig. 1 is a front elevational view of my device showing the mounting of a series of micrometer gauges across the casting wheel surface, Fig. 2 is a side elevational view of my device, taken on the line 2—2 of Fig. 1, showing, partly in cross-section, the construction of one of the micrometer gauges and the relative position of the same with respect to the hopper and the casting wheel, Fig. 3 is a front elevational view, partly in cross-section, of one of the micrometer gauges, showing the means for raising and lowering a gauge spindle, and Fig. 4 is a detailed view in cross-section, taken on the line 4—4 of Fig. 3 and showing, on a slightly enlarged scale, the means for adjusting the zero point reading on the dial of the gauge.

Like reference numerals indicate like parts throughout the several views of the drawing.

Referring to Fig. 1 of the drawing, there is shown the mounting of a series of micrometer gauges, generally indicated by reference numeral 5, with respect to the casting wheel 6. The mounting of the gauges comprises a cross-piece 7 of angle iron, which is suitably attached to uprights or standards 8 fixed to side castings 9 which also support the film dope hopper 11, and a cross-piece 12 of channel iron which is also carried by side castings 9.

For each dial 13 of the micrometer gauge there is provided on the angle iron cross-piece 7 a bracket 14 suitably secured to said angle iron. The bracket 14 is adapted to receive the bifurcated ear 15 suitably mounted on the casing of the dial 13, the construction being such that the dial may be adjusted on said bracket relative to gauge spindle 16 of the micrometer gauge.

The cross-piece 12 is adapted to support the gauge spindle 16. To this end the flanges 17 are provided with openings 18 into which are fitted upper bearing member 19 and lower bearing member 21, in which bearing members the gauge spindle is adapted to slide freely. The upper end of the gauge spindle is grooved at 22 and the bearing member 19 is provided with a screw 23 having a projection 24 extending into said grooved portion of the gauge spindle for the purpose of preventing the gauge spindle from turning in said bearing members.

The upper end of the spindle is also provided with a screw threaded opening 25 adapted to receive a screw 26 which is adapted to be raised and lowered with respect to the gauge spindle by means of a knurled head 27.

The screw 26 is adapted to cooperate with dial spindle 28 for the purpose of setting the dial at the desired reading. The screw 26 may be set in the adjusted position by means of lock nut 29. The lower end of the gauge spindle is provided with a pin point 31 which is preferably made of copper or stainless steel. The gauge spindle is also provided with an expansible spring 32 which acts against the lower portion of bearing member 19 and a collar 33, which collar is held in position by means of a pin 34. The spring 32 is adapted to force the gauge spindle in a downward direction. For the purpose of raising the gauge spindle there is provided a lever 35, pivoted at 36 on the web 37 of the channel-iron cross piece 12. The lever 35 is provided with a bifurcated end 38 which cooperates with the collar 33 on the gauge spindle 16. The other end 39 of the lever acts as a bearing member for screw 41 which is provided with a knurled head 42 for turning the screw. The screw 41 cooperates with a screw-threaded bearing 43 fixed in a suitable opening in the upper flange of channel-iron cross-piece 12.

In operation, the zero point is taken by lowering the pin 31, which lowering is effected by turning screw 41 so as to raise the same until it just touches the casting surface of the casting wheel 6. When the film dope 44 is spread as by means of a scraper 45, as is well understood in the art, the pin 31 is again lowered until it touches the surface of the film dope. The reading of the dial is taken and the pin instantly raised and wiped clean. The fine pin scratch on the surface of the film dope quickly flows out and leaves no blemish in the finished film. After readings are made on the several micrometer gauges the hopper feed is adjusted to give at each point the proper film dope thickness, as determined by experiment, for the particular film dope used and the thickness which is required in the finished article. Frequent readings and adjustments can be made without interrupting the casting operation and without cutting the film.

When casting on the wheel, which is approximately 16 ft. in diameter, the radius of the wheel surface may vary a few thousandths of an inch in relation to the scraper by reason of temperature changes or other causes. As a check against such variations a gauge 46 is mounted near the edge of the casting surface at a portion where the surface is not covered by film dope. From the readings on this gauge the zero readings of the dope thickness gauges can be corrected without the necessity of running the gauge spindle down through the film dope to the casting surface. More gauges, such as gauge 46, may be used for checking variations in wheel surface. For example, there may be one dial indication at each edge and one or more at the center of the wheel surface back of the hopper.

It is to be understood that the foregoing detailed description and drawing is given merely by way of illustration and that many variations may be made therein without departing from the spirit of my invention.

Having described my invention, what I desire to secure by Letters Patent is:

1. Process for the production of film of uniform gauge, which comprises flowing film dope on to a casting surface to form a film, and measuring the thickness of the film on the casting surface while the film dope is still in a flowable condition by a measuring instrument which scratches the surface of the cast film, the scratch on the surface of the film quickly disappearing due to the flowing out of the still plastic film dope.

2. Process for the production of film of uniform gauge, which comprises flowing film dope on to a casting surface to form a film, and measuring the thickness of the film on the casting surface while the film dope is still in a flowable condition by a measuring instrument which scratches the surface of the cast film at a plurality of points across the width thereof, the scratches on the surface of the film quickly disappearing due to the flowing out of the still plastic film dope.

3. Process for the production of film of uniform gauge, which comprises flowing film dope on to a casting surface to form a film, and measuring the thickness of the film on the casting surface while the film dope is still in a flowable condition by a measuring instrument which scratches the surface of the cast film near the point at which the film dope is flowed on to the casting surface, the scratch on the surface of the film quickly disappearing due to the flowing out of the still plastic film dope.

4. In a device for indicating the gauge of film in order to facilitate the control of the gauge, the combination with a casting surface adapted to receive a film flowed thereon, of means in close proximity to the point at which the casting surface receives the film for measuring the thickness of the film, said measuring means including means co-operating with the casting surface for producing a visual indication on the surface of the cast film while said film dope is still in a flowable condition.

5. In a device for indicating the gauge of film in order to facilitate the control of the gauge, the combination with a casting surface adapted to receive a film flowed thereon, of means in close proximity to the point at which the casting surface receives the film for measuring the thickness of the film dope, said measuring means including a pin point which co-operates with the casting surface to gauge the film, between which pin point and the casting surface there is relative motion, said pin point producing a scratch on the surface of the cast film while the film dope is still in a flowable condition.

6. In a device for indicating the gauge of film in order to facilitate the control of the gauge, the combination with a casting surface adapted to receive a film flowed thereon, of means in close proximity to the point at which the casting surface receives the film for measuring the thickness of the film dope, said measuring means comprising a spindle terminating in a pin point which co-operates with the casting surface to gauge the film, a micrometer gauge co-operating with said spindle and means for raising and lowering said spindle towards and away from said casting surface.

7. In a device for indicating the gauge of film in order to facilitate the control of the gauge, the combination of a casting surface adapted to receive a film flowed thereon, of means in close proximity to the point at which the casting surface receives said film for measuring the thickness of the film, said measuring means including means co-operating with the casting surface for producing a visual indication on the surface of the cast film while said film is still in a flowable condition so as to indicate the gauge, and means for measuring the variations of the face of the casting surface.

CARSTEN LYNG.